Aug. 4, 1959  S. W. SEIDLER  2,898,453
INDICATOR UNIT FOR SITE SURVEY
Filed Dec. 29, 1955
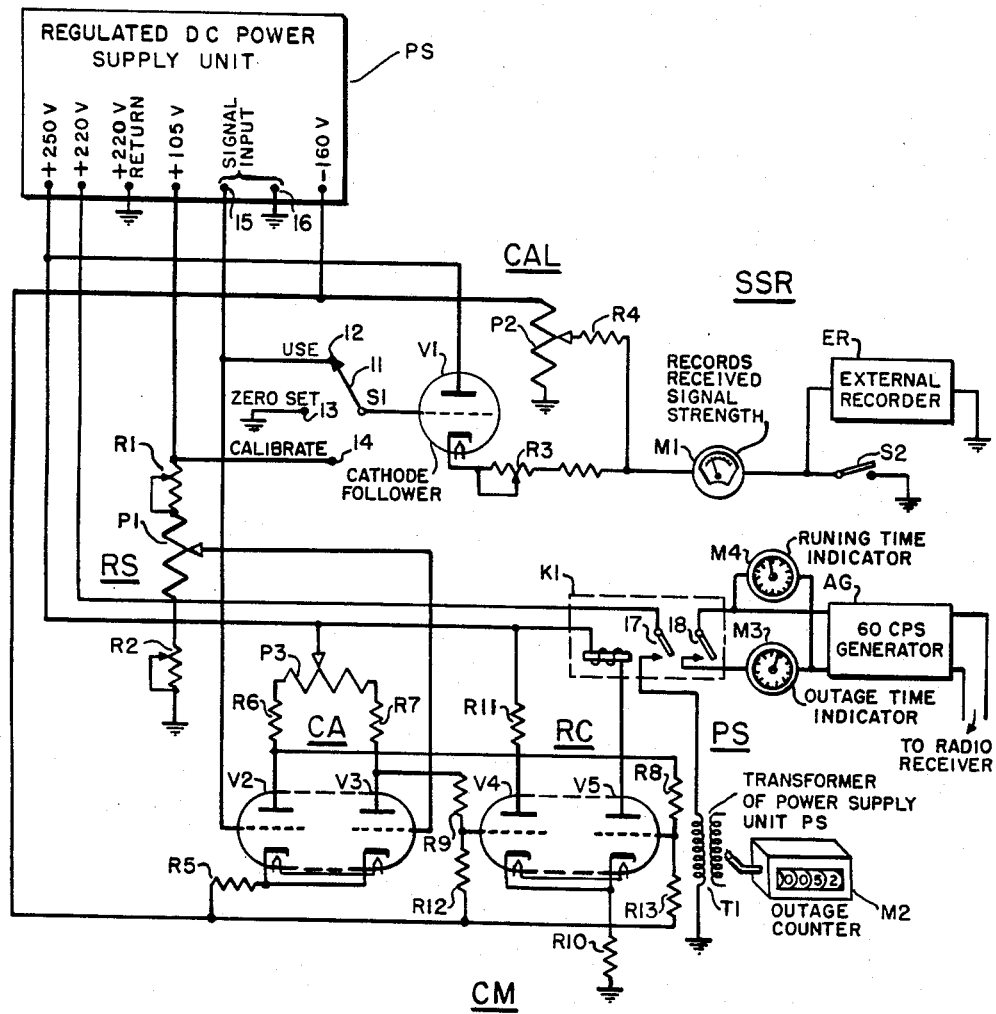
INVENTOR,
SANFORD W. SEIDLER.
BY
*Harry M. Saragovitz*
ATTORNEY

United States Patent Office 2,898,453
Patented Aug. 4, 1959

2,898,453

INDICATOR UNIT FOR SITE SURVEY

Sanford W. Seidler, New York, N.Y., assignor to the United States of America as represented by the Secretary of the Army Application December 29, 1955, Serial No. 556,373

2 Claims. (Cl. 250—1)

The invention relates in general to signal monitoring, indicating and recording apparatus, and particularly to such apparatus used for observing, indicating and recording the effects of abnormal transmission conditions on the transmitted signals in a signal wave transmission system, such as a radio communication system.

The invention is particularly suitable for use in, although it is not limited to, field strength measuring apparatus of the type used for making studies or surveys of the characteristics of the signal transmission medium or wave propagation paths between a radio transmitter and a radio receiver in a radio communication system, for the purpose of locating the most desirable sites for such equipment. Proper communication in such a system requires that the strength of the incoming signals at the receiver be maintained above a predetermined minimum acceptance level. Because transmission conditions over the wave transmission medium in such a system, particularly in certain locations vary greatly from time to time, it is desirable that the received signals be monitored over an extended period of time in order to determine the frequency of occurrence and the duration of the intervals of reduction in signal strength below the acceptable minimum level under all conditions of use of the communication system. It is desirable also that the monitoring apparatus used for this purpose be such as to require a minimum of attention from a human operator during its periods of use; that it be adapted for use with signal transmission systems employing wave transmission mediums of different lengths or subject to different degrees of abnormal transmission conditions; that it include means for quickly and accurately adjusting and calibrating its meters and recording apparatus; and that it be capable of indicating and recording with a sufficient degree of accuracy all the information necessary to properly evaluate the operating efficiency of the system under test.

A general object of the invention is to attain the above-referred to desirable results with monitoring apparatus of simple and economical construction.

Another object is to provide continuous indication of the strength of the transmitted signals at a receiving point of a radio or other signal wave communication system.

Another object is to indicate and record with a desired accuracy the number of occurrences of abnormal signal transmission conditions in a signal transmission system during a predetermined time interval of use of the system, and the elapsed time for all such occurrences during this time interval.

A more specific object is to indicate and record with a desired degree of accuracy the number of "outages," i.e., the number of intervals in which the voltage level of the incoming signals at the receiver of a signal wave transmission system falls below a predetermined acceptable value during a given test time period; and the "outage time," i.e., the summation of the elapsed times of all of the outages during this period.

A related object is to integrate outages in an electrical signaling system so as to determine the total time during a test time period in which the voltage level of the signals at a receiving point in the system falls below a predetermined value, due to abnormal transmission conditions in the wave transmission medium between the transmitting and the receiving point.

The monitoring apparatus for accomplishing these objects in accordance with the invention includes a recording circuit for providing continuous indication of the strength of the incoming signals at the receiver of such a system; a circuit for indicating and recording outages and total outage time; and a calibration circuit. The operation of the outage and outage time indicating and recording circuit involves continuously comparing the incoming signal voltage with a reference D.-C. voltage of selected amplitude value in a comparison amplifier; utilizing the difference current produced in the output circuit of the amplifier in response to each outage to control relay means for rendering suitable indicator means operative to respectively count the number of outages occurring in a given test time period; and to integrate the outages over this time period to provide an indication of the summation of the elapsed time of all the outages for comparison with the total "running" time of the monitoring circuit recorded by another indicator.

A feature of the invention is a calibration circuit associated with the monitoring apparatus and controlled by operation of an input switch, including a cathode follower tube, a potentiometer and one or more variable resistors connected to the local D.-C. power supply, for enabling the operator by suitable adjustment of the resistance values of these elements to provide a zero setting for the signal strength recording meter and recorder, and to calibrate this meter and recorder for extreme outage level settings.

The single figure of the drawing illustrates a schematic circuit of one embodiment of a monitoring apparatus in accordance with the invention which was constructed and which operated satisfactorily.

The embodiment of the monitoring apparatus of the invention illustrated in the drawing comprising as main elements: a signal strength recording branch SSR; a reference or test signal supply branch RS; a comparison and measuring branch CM; and a calibration branch CAL. Auxiliary elements include switches S1 and S2; a regulated D.-C. power supply unit PS; a local (60 c.p.s.) alternating wave generator AG; and an external recording device ER.

The switch S1 consists of a switch arm 11 and three switching contacts 12, 13 and 14, which will be referred to hereinafter as the Use, Zero Set and Calibrate contacts, respectively. The switch arm 11 is permanently connected to the calibration branch CAL and through that branch to the received signal strength recording branch SSR. The Use switching contact 12 is connected to one of the input terminals 15, 16 of the monitoring apparatus, which as shown, may be mounted on the power supply unit PS. The Zero Set switching contact 13 is connected to ground; and the Calibrate switching contact 14 is connected to a source of positive potential (+105 volts) in the regulated power supply unit PS.

The reference or test signal supply branch RS includes the potentiometer P1 and the variable resistors R1 and R2 connected in series between ground and a source of positive potential (+105 volts) in the regulated power supply unit PS. By adjustment of P1, R1 and R2, a D.-C. test or reference voltage of any desired amplitude within a calibrated range dependent on the supplied D.-C. voltage and the value of resistance in the branch RS may be obtained at the variable switch arm of the potentiometer.

The calibration branch CAL includes a 3-electrode cathode follower vacuum tube V1 having its control grid connected to the pivoted end of switch arm 11 of switch S1, its anode connected to a source of positive anode potential (+250 volts) in power supply unit PS and a variable resistor R3 in series with the cathode lead of tube V1. The signal strength recording branch SSR includes an indicating meter M1 and an external recorder ER connected in series between variable resistor R3 of the CAL branch and ground, and an associated switch S2. The calibration branch CAL also includes a potentiometer P2 connected between ground and the source of negative potential (−160 volts) in the regulated power supply PS and having its variable arm connected through a resistor R4 to a point in the circuit connecting variable resistor R3 of the calibration branch CAL to meter M1 in the signal strength recording branch SSR.

The comparison and measuring branch CM includes a comparison amplifier CA comprising two 3-electrode amplifying vacuum tubes V2 and V3 included within a single outer envelope; a relay control circuit RC comprising the two 3-electrode vacuum tubes V4 and V5 within a single envelope; an electromagnetic switching relay K1; an Outage Counter M2; and the Outage Time indicator or clock M3.

The control grid-cathode circuit of the tube V2 in comparison amplifier CA is connected across the input terminals 15, 16 of the monitoring apparatus to which the signal wave to be monitored is supplied through jackplug arrangements or other means (not shown) from any suitable point at the receiving end of a radio communication system or in the associated field strength measuring apparatus. The cathodes of tubes V2 and V3 of the comparison amplifier CA are connected through a common cathode resistor R5 to a source of negative potential (−160 volts) in the regulated power supply PS. The anodes of the tubes V2 and V3 of amplifier CA are connected through equal individual resistors R6 and R7 to opposite ends of the resistance portion of potentiometer P3 the variable arm of which is connected to the positive source of anode potential (+250 volts) in the power supply unit PS.

The anode of the tube V2 in the comparison amplifier CA is connected directly through the series resistor R8 to the control grid of the tube V5 in the relay control circuit RC, and the anode of tube V3 in the comparison amplifier CA is connected directly through a series resistor R9 of the same value as R8 to the control grid of the tube V4 in the relay control circuit RC. The cathodes of the tubes V4 and V5 of the relay control circuit RC are connected through a common cathode resistor R10 to ground.

The anode of the tube V4 in the relay control circuit RC is connected through an individual resistor R11 to the source of positive anode potential (+250 volts) in the power supply unit PS, and the anode of the tube V5 in the relay control circuit RC is connected through the winding of the control relay K1 to the same source of positive anode potential (+250 volts) in the power supply unit PS. The control grids of the tubes V4 and V5 are also connected to the source of negative potential (−160 volts) in the power supply unit PS through individual series resistors R12 and R13, respectively, of equal values. The filament heaters of the tubes V1 to V5 are supplied with heating current of suitable value from any suitable power source (not shown).

The monitoring apparatus of the invention as described above operates in the following manner:

When the switch arm 11 of the switch S1 is thrown to the Zero Set contact 13, a small plate current will flow in the cathode follower tube V1. To make the received signal strength indicating meter M1 indicate zero, the variable arm of the potentiometer P2 is adjusted so that this current is balanced out by an opposing current of equal value flowing therethrough from the −160 volts power source. If it is desired to have the meter M1 or the external recorder ER cover the complete range of attenuation in the transmission medium or signal propagation path of the system under test, with the switch arm 11 of switch S1 thrown to the Calibrate switching contact 14, the potentiometer P2 and the variable resistor R3 are readjusted to calibrate this meter and recorder for the extreme outage level settings. With switch arm 11 of switch S1 thrown to the Use contact 12, a portion of the incoming signals will be applied from input terminals 15, 16 through the CAL branch to the meter M1 and the external recorder ER in the branch SSR. The strength of these signals will be continuously indicated by the meter M1 and will be recorded by the external recorder ER. The function of the cathode follower tube V1 in the branch CAL is to provide the necessary impedance matching between the signal strength recording branch SSR and the common input circuit for the latter branch and the comparison and measuring branch CM so as to prevent reaction effects when both are in use. The switch S2 must be open when the external recorder ER is used.

A portion of the incoming signals to be monitored is also impressed through input terminals 15, 16 on the control grid-cathode circuit of the tube V2 in the comparison amplifier CA. By adjustment of the potentiometer P1 a reference or test signal voltage of the necessary amplitude is applied through the variable arm of the potentiometer P1 to the control grid-cathode circuit of the tube V3 in amplifier CA to adjust the level of the difference currents in the balanced anode-cathode circuits of tubes V2 and V3 in the amplifier CA to zero or such low value that they will not cause operation of the relay control circuit RC when the level of the signal waves applied to the grid-cathode circuit of the amplifier tube V2 is above the minimum acceptable value. By proper adjustment of the variable resistors R1 and R2 in the reference signal supply branch RS, the extreme settings of the potentiometer P1 are brought into correspondence with the measurable limits of attenuation in the signal transmission path between the radio transmitter and receiver. For example, when the potentiometer P1 is turned to the highest operating position (−50 dbm), the voltage at its arm should equal the voltage at input terminal 15, when the received signal strength is at its maximum (−50 dbm).

The incoming signal and the desired outage level are thus effectively compared in the comparison amplifier CA. Accurate balance between the two tubes V2 and V3 of this amplifier is insured by proper adjustment of the setting of the plate circuit potentiometer P3. If the signal voltage drops below the predetermined minimum acceptable level, the output currents of the comparison amplifier tubes V2 and V3 applied through the resistors R8 and R9 to the control grids of the two tubes V4 and V5, respectively, of the relay control circuit RC will drive these tubes in opposite polarity. Because of the common cathode coupling resistor R10 in the control circuit RC, when the amplitude level of the signal voltage applied to the control grid-cathode circuit of tube V2 in the comparison amplifier CA falls below the tolerable outage level, the difference between the amplitude of the currents applied to the control grids of tubes V4 and V5 in RC will be such that the current plate passing through the winding of the relay K1 in the anode-cathode circuit of tube V5 will rise sharply causing operation of that relay to close its two sets of contacts 17 and 18.

The closure of one set of contacts 17 places 220 volts D.-C. line voltage across the primary of the power transformer T1 in the power supply unit PS, causing a corresponding A.-C. voltage to be induced in the secondary of that transformer. This will cause the Outage counter M2, which may be of any one of the known types of electrically-actuated counting devices, to be advanced by one unit, and this outage will be recorded by that counter. The closure of the second set of contacts 18 will connect the Outage Time indicator or clock M3 across the local A.-C. (60 c.p.s.) wave generator AG. The indicator or clock M3 will continue to run synchronously until the end of the outage (period of reduction of the amplitude level of the signals applied to the control grid-cathode circuit of the tube V2 in comparison amplifier CA below the tolerable value) when energizing current will be removed from the winding of relay K1. When the strength of the incoming signal rises above the predetermined acceptable outage level, the contacts 17 and 18 of relay K1 will reopen to remove the 220 volt source from the power transformer T1, and to disconnect the outage time indicator M2 from across the 60 c.p.s. generator AG. However, the outage time indicator or clock M3 will retain its indication until the next outage interval occurs when the output of the comparison amplifier branch circuit CM will cause reoperation of relay K1 to close its contacts 17 and 18. The reclosing of contacts 17 will cause 220 volts D.-C. to be reapplied across the power transformer T1 to cause the advancement of the counter M1 by another unit, which will be recorded. The reclosing of switch contacts 18 will reconnect the time indicator M3 across the A.-C. generator AC for a second time interval and the elapsed time of that interval as well as that of succeeding intervals of operations of the relay K1, will be added to the previous time indication of indicator M3.

The accumulated outage time for any test time period recorded in M3 may later be compared with the total running time recorded by a similar indicator or clock M4 permanently connected across the output of the local 60 c.p.s. alternating current supply generator AG.

The values of the various operating voltages in the monitoring circuit referred to in the above description are to be considered as typical and not as limiting the invention. In the circuit as described and illustrated, the two vacuum tubes in the comparison amplifier CA and in the relay control circuit RC are shown as respectively contained in a single envelope. It is apparent that each individual tube may be contained in a single envelope. Other modifications of the circuits illustrated and described which are within the spirit and scope of the invention will occur to persons skilled in the art.

What is claimed is:

1. Signal monitoring and indicating apparatus for use at a receiving point of a signal wave transmission system including a transmission medium for the transmitted signals subject to variable transmission conditions, said apparatus including a source of test voltage of an amplitude equal to the normal amplitude of the incoming signals at the receiving point when the attenuation of the system is within tolerable limits, input means for diverting one energy portion of the incoming signal waves at the receiving point, a comparison amplifier for comparing the diverted signal waves with the test voltage and producing an unbalance current in its output proportional to the difference between their amplitudes, a control circuit coupled to the amplifier output and operatively responsive to the amount of unbalance current therein produced in response to a reduction in the amplitude level of the signal waves at the receiving point below the minimum tolerable value, a counting device adapted to be operatively energized in response to each operation of said control circuit, for counting and recording the number of operations thereof in a given test time period and a timing device also adapted to be operatively energized in response to each operation of said control circuit, for integrating the time durations of all intervals of operation of said control circuit during the test period and for recording the total elapsed time for all these intervals, said comparison amplifier comprising a pair of amplifying vacuum tubes each having a cathode, an anode and a control grid, and circuits interconnecting these electrodes, a common cathode resistor coupling the grid-cathode circuits of said tubes, the diverted portion of the incoming signal waves being impressed on the control grid-cathode circuit of one of said tubes and the test voltage being impressed on the control grid-cathode circuit of the other tube, the anode-cathode circuits of the two tubes being connected in balanced relationship, said control circuit comprising a second pair of vacuum tubes each having a cathode, an anode and a control grid, and circuits interconnecting these electrodes, the control grid-cathode circuit of each of said second pair of tubes being respectively coupled to the anode-cathode circuit of a different one of the first pair of tubes so that said second pair of tubes are driven in opposite polarities by the output currents of the first pair of tubes, a resistor common to the cathode circuits of the second pair of tubes, and a relay in the anode-cathode circuit of one of said second pair of tubes, operatively responsive to the sharp rise in the current produced therein in response to a reduction in the amplitude level of the signals applied to the control grid-cathode circuit of said one tube in said comparison amplifier below said minimum tolerable value, said counting device and said timing device being rendered operative during the operated periods of said relay.

2. Signal wave monitoring apparatus including an input circuit for receiving incoming signal waves of varying amplitude level to be monitored; a switch having a switch arm and three switch contacts; one branch circuit including metering means for respectively indicating and recording variations in the strength of the incoming signal waves; a second branch circuit for detecting and recording the number of outages occurring in the received signal waves during a given time period, and for recording the total elapsed time for all of said outages during said period, adapted for connection to said input circuit through said switch when its switch arm is operated to one of said contacts, and a calibration circuit for said metering means including a cathode follower vacuum tube having a heated cathode, an anode positively biased with respect to said cathode, and a control grid connected to the switch arm of said switch, a variable resistor connected in series between said cathode and said metering means; a third circuit including a potentiometer and a source of negative voltage, adapted for connection across the portion of said calibration circuit including the control grid-cathode space path of said tube and said variable resistor in series through said switch when its switch arm is operated to a second one of said switch contacts; and a fourth circuit including a source of positive voltage, the control grid-cathode space path of said tube and said variable resistor in series adapted for connection across said metering means through said switch when its switch arm is operated to the third of said switch contacts; said third circuit when said switch is operated to said second switch contact and said potentiometer is properly adjusted providing an opposing current for balancing out the anode current through said tube and thus adjusting the indication of the metering means to zero; and said fourth circuit when said switch arm is operated to said third contact and said potentiometer and said variable resistor are properly adjusted providing means for calibrating said metering means so that it will indicate and record the extreme variations of amplitude level of the incoming signal waves.

References Cited in the file of this patent

UNITED STATES PATENTS

| | | |
|---|---|---|
| 2,200,233 | Whitehead | May 7, 1940 |
| 2,286,036 | Lamb | June 9, 1942 |
| 2,337,441 | Atkinson et al. | Dec. 21, 1943 |
| 2,359,767 | Keinath | Oct. 10, 1944 |
| 2,637,786 | Bordewieck | May 5, 1953 |
| 2,676,253 | Ayres | Apr. 20, 1954 |
| 2,688,441 | Merrill et al. | Sept. 7, 1954 |
| 2,752,589 | De Long | June 26, 1956 |
| 2,779,869 | Gerks | Jan. 29, 1957 |